UNITED STATES PATENT OFFICE.

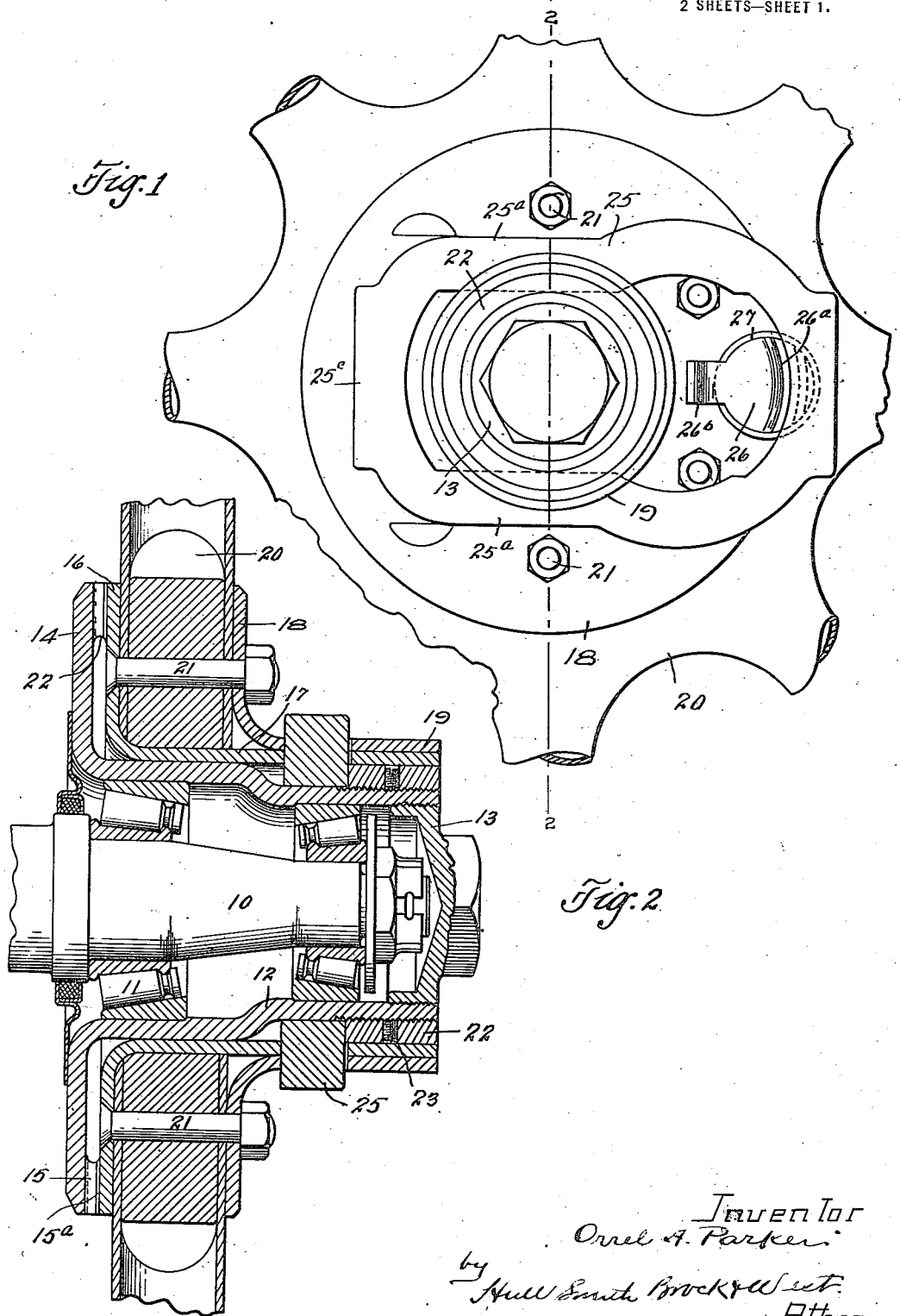

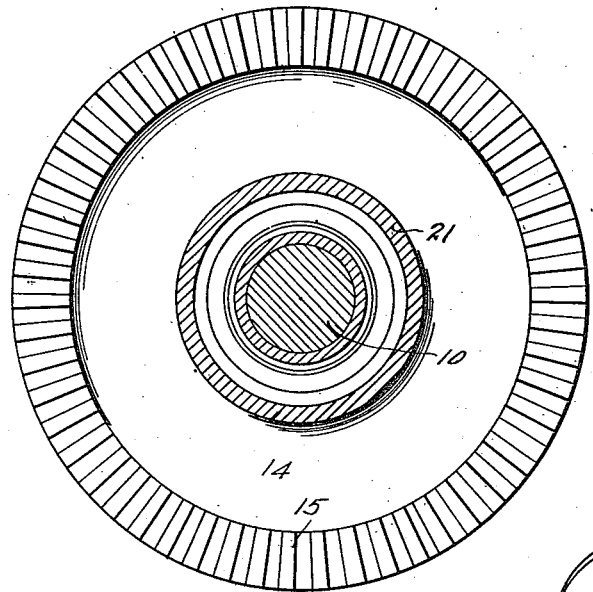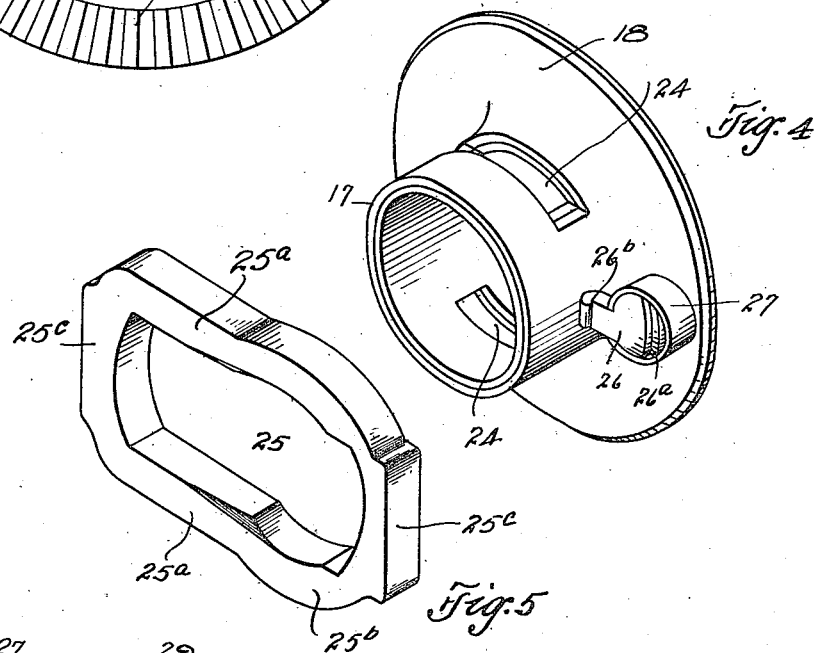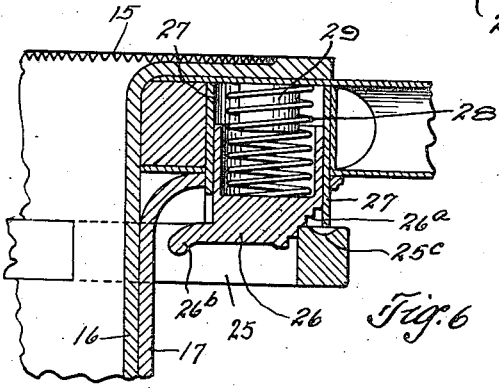

ORREL A. PARKER, OF CLEVELAND, OHIO.

DEMOUNTABLE WHEEL.

1,413,347. Specification of Letters Patent. Patented Apr. 18, 1922.

Application filed March 17, 1917. Serial No. 155,486.

*To all whom it may concern:*

Be it known that I, ORREL A. PARKER, a citizen of the United States, residing at Cleveland, in the county of Cuyahoga and State of Ohio, have invented a certain new and useful Improvement in Demountable Wheels, of which the following is a full, clear, and exact description, reference being had to the accompanying drawings.

This invention relates generally to wheels and more particularly to a demountable wheel.

The invention is especially adapted for quick demountable wheels used upon racing cars although it can be used equally as well upon ordinary pleasure and commercial cars.

One object of the invention is to provide means for securing a wheel upon a hub, which means can be locked and unlocked in an exceedingly short space of time, and another object of the invention is to provide a wheel securing means of this character which is usable in connection with the standard types of wheels and hubs without any substantial or material alteration to these standard parts.

A further object of the invention is to provide a hub-securing means for a quick demountable wheel which will be connected to the wheel at all times when the same is either mounted or demounted, thereby preventing any possible temporary loss or misplacement of the locking parts. With these objects in view and certain others which will become apparent as the description proceeds, the invention may be defined as consisting in the novel features of construction and combination all of which will be first fully described and then pointed out in the claims.

In the drawings forming a part of this specification Fig. 1 is a front elevation of the hub portion of a demountable wheel embodying my invention; Fig. 2 is a longitudinal vertical section on the line 2—2 of Fig. 1; Fig. 3 is a transverse vertical section taken on the line 3—3 of Fig. 2; Fig. 4 is a detail perspective view of the outer flange and sleeve portions of the front and rear flanges; Fig. 5 is a detail perspective view of the locking or wedge link; and Fig. 6 is a detail sectional view of the means for locking the wedge link in either locked or unlocked position. Referring to the drawings, 10, 11 and 12 indicate respectively the usual or standard types of spindle, bearings, and hub, the outer end of this hub 12 being closed by the usual hub nut 13, and these parts thus briefly described will be designated as the permanent hub because they are permanently attached to the axle as distinguished from the demountable hub which is connected to the wheel body and is mounted upon and demounted from the permanent one, when the wheel as a whole is mounted or demounted.

The permanent hub 12 is formed at the rear end with a flange or circular plate 14, the forward face of said plate being provided with driving lugs or serrations 15, preferably arranged about the outer edge of the flange or plate as most clearly shown in Fig. 3, the serrations being sufficiently fine and of such an angle that the two sets of teeth will mesh in any position and without any attention. Any other suitable form of driving lug or connection can be employed, the one illustrated being designed for racing cars, while for ordinary pleasure or commercial cars a small number of spaced lugs or studs may be employed.

The demountable hub consists of the inner plate 16, and integral inner sleeve 17, and the outer plate 18, and integral outer sleeve 19, said plates being arranged in spaced parallel relation to receive therebetween the spokes or central portion of wheel body 20, while the inner and outer sleeves 17 and 19 contact with each other along their forward portions as most clearly shown in Fig. 2.

The central portion 20 of wheel is connected to the demountable hub plates or flanges by bolts 21, passing through both plates or flanges and the central portion of wheel, and in the drawings I have shown the central portion of a pressed steel wheel, but it will be understood that my invention is applicable to all classes of wheels, viz:—wooden wheels, wire wheels, and sheet and cast metal wheels.

The rear face of the plate or flange 16 is provided with driving lugs or serrations 15ª which correspond with and engage the serrations 15 on the flange or plate 14 and make a positive driving connection between the permanent and demountable hubs when the latter is properly fixed and locked upon the former.

The inner sleeve 17 fits snugly upon the enlarged rear portion of the permanent hub 12, while outer end of this sleeve bears upon a ring nut 22, screwed upon the forward and reduced end of the permanent hub, this ring nut 22 being screwed upon the threaded end of hub and locked by means of set screws 23 turned down below the surface of the ring. This ring serves as a shoulder on the end of the permanent hub and extends inwardly or rearwardly a short distance and it also serves as a spacing bearing for the forward end of the demountable hub to contact with.

The sleeve portions of the demountable hub are formed with transverse openings 24 upon opposite sides as most clearly shown in Fig. 4, and the forward walls of these openings are substantially coincident with the rear face of the ring 22, as shown in Fig. 2.

These openings 24, are made to receive a wedge link 25 which contacts with the ring 22 on permanent hub when said link is in locked position but permits said ring to pass therethrough when said link is in unlocked position. In order to do this the link is made keyhole shaped, that is the members 25$^a$ are straight and parallel, while the portions 25$^b$ are curved upon the arc of a circle the diameter of which is sufficient to permit the ring 22 on permanent hub to pass therethrough. The portions 25$^a$ and 25$^b$ are connected by end pieces 25$^c$ and this link can be made in any suitable or approved manner, preferably in one piece. The parts of 25$^a$ which engage the shoulder 22 taper towards the curved portion 25$^b$. When the wedge link is connected to the demountable hub it remains a part of said hub, being moved transversely to lock or unlock said hub as the case may be, and it is obvious that when the link is moved so as to bring the tapered contracted portions across the center line of the wheel axis the hub will be locked, and unlocked when the link is moved so as to bring the enlarged portion thereof in line with the wheel axis. After the demountable wheel has been placed upon the permanent hub, a single movement of the link locks the wheel mounted by driving the wedges 25$^a$ behind the shoulder 22 and a single movement in the reverse direction unlocks the wheel ready for demounting.

In order to hold the link in either its locked or unlocked position I provide a bolt 26 working in a tubular guide 27 fastened in the detachable hub, at one side, adjacent the enlarged end of link, and this bolt 27 is normally projected forward or outward by a spring 28, contained in the sleeve and centered by a lug 29, also within the sleeve.

The side of this bolt remote from the axis of the wheel is stepped at 26$^a$ to engage the end piece of the link when said link is in locked position, as shown in Figs. 1 and 6, the spring keeping the bolt and link in contact. The opposite side of the bolt end is formed with a nose 26$^b$ to fit into a slight depression 25$^d$, formed in its end piece 25$^c$, when the link is moved to the unlocked position. The outer end of the bolt has a slight depression to receive the end of a tool which forces the bolt back or inward when it is desired to release the link. When the wheel is demounted and carried as a spare, the link remains with the enlarged portion thereof in alignment with the sleeve portions of the demountable hub, and as previously stated the link is held in this position by the spring actuated bolt having its nose in engagement with a slight recess or depression in the rear face of the end member of the link.

When it is desired to mount the wheel upon the permanent hub it is only necessary to slip the demountable hub upon the permanent hub, then by a sharp blow upon the contracted end the link will be shifted laterally bringing the tapered portions 25$^a$ to the rear of the ring 22 carried upon the forward end of the permanent hub and thereby securely wedging the demountable hub and wheel upon the permanent hub, and when the link is forced over into this locked position as indicated in Fig. 1, the spring actuated bolt will engage the end piece as most clearly shown in Fig. 6 and hold the link securely locked in any one of its several positions according to the distance the wedge link is moved to hold the wheel tight.

When it is desired to demount the wheel it is only necessary to press in the spring bolt and give the link a sharp blow upon the expanded end so as to bring the expanded portion into register with the sleeve portions of the hub and then the wheel can be quickly and easily removed from the permanent hub.

By means of a device constructed as hereinbefore described, it will be seen that I dispense with all devices involving screwing or turning operations which require some time both for the actual operation itself and also for the proper placing of the parts before the turning operations can begin; and it will also be noted that all of the parts for effecting the locking or securing of the demountable hub upon the permanent hub are carried by the demountable hub itself and remain a part thereof and consequently all danger of temporary loss or misplacement is avoided.

By means of the locking device herein shown and described, I am able to accomplish the mounting and locking and unlocking and demounting operations more quickly than any of the demountable devices now in use and of which I am aware.

Having thus described my invention, what I claim is:—

1. The combination, with a permanent hub, of a demountable hub arranged thereon, a wedge link carried by said demountable hub and adapted to be moved transversely with reference to the axes of said hubs whereby said link is moved into an open or closed position as specified.

2. The combination, with a permanent hub, of a demountable hub arranged thereon, a transversely movable link having an enlarged portion together with means carried by said demountable hub for holding said link in either of its transverse positions.

3. The combination with a permanent hub having a driving plate, of a demountable hub adapted to fit upon the permanent hub also having a plate adapted to engage the driving plate of permanent hub, and transversely movable locking link carried by said demountable hub for engaging said permanent and demountable hubs between the front and rear ends of said hubs, together with means carried by said demountable hub for locking the link in either of its transverse positions.

4. The combination with a permanent hub, of a demountable hub adapted to fit thereon, said hubs having interengaging driving connections, said demountable hub being transversely slotted, a locking link movable transversely in said slots together with means carried by said demountable hub for locking said link in either of its transverse positions.

5. The combination with a permanent hub, of a demountable hub adapted to be arranged thereon, a transversely movable link carried by the demountable hub and adapted to engage the demountable and permanent hubs, and a spring actuated axially movable bolt carried by said demountable hub and adapted to hold said link in either of its adjusted positions.

In testimony whereof, I hereunto affix my signature.

ORREL A. PARKER.